United States Patent
Stephenson et al.

(10) Patent No.: US 7,047,714 B1
(45) Date of Patent: May 23, 2006

(54) TONGUE SWING CYLINDER ARRANGEMENT FOR ROTARY SIDE-PULL MOWER-CONDITIONER

(75) Inventors: Roger Dale Stephenson, Ottumwa, IA (US); Annette Rae Roe, Fremont, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/049,114

(22) Filed: Feb. 2, 2005

(51) Int. Cl.
*A01D 34/24* (2006.01)
*A01D 34/42* (2006.01)
*A01D 34/63* (2006.01)

(52) U.S. Cl. ..................................................... 56/15.2
(58) Field of Classification Search ................ 56/15.2, 56/14.7, 10.1, 218, 15.6, 15.5
See application file for complete search history.

(56) References Cited

U.S. PATENT DOCUMENTS

| | | | | |
|---|---|---|---|---|
| 4,838,013 A * | 6/1989 | Louet Feisser et al. | ...... | 56/13.6 |
| 4,843,804 A * | 7/1989 | Wellman | ................ | 56/16.4 C |
| 4,896,493 A * | 1/1990 | Neuerburg | .................... | 56/255 |
| 4,974,399 A * | 12/1990 | Haberkorn | ........................ | 56/6 |
| 5,101,616 A * | 4/1992 | Wolff | .......................... | 56/15.2 |
| 5,566,536 A * | 10/1996 | Krafka et al. | ................. | 56/15.2 |
| 6,845,603 B1 * | 1/2005 | Stephenson et al. | ........... | 56/218 |

* cited by examiner

Primary Examiner—Árpád Fábián Kovács

(57) ABSTRACT

A side-pull mower-conditioner includes a wheeled frame from which a crop harvesting header is suspended. A draft tongue carrier forms a forward projection of the frame and terminates at a forward end located above the header. A draft tongue includes a rear end pivotally coupled to the forward end of the draft tongue carrier by an upright pivot pin defining an upright pivot axis about which the tongue can be swung between a rightmost transport position and a leftmost working position. An extensible and retractable hydraulic actuator is located leftward of the upright pivot axis and is coupled between the draft tongue carrier and the draft tongue and is fully extended when the draft tongue is in the transport position, and is fully retracted when the tongue is in the leftmost working position. A lock structure is provided for locking the actuator in its extended position, and a stop structure is provided for selectively limiting the retraction of the actuator for disposing the tongue in a desired working position which is rightward of the leftmost working position.

8 Claims, 4 Drawing Sheets

TONGUE SWING CYLINDER ARRANGEMENT FOR ROTARY SIDE-PULL MOWER-CONDITIONER

FIELD OF THE INVENTION

The present invention relates to a rotary side-pull mower-conditioner, and more particularly, relates to a tongue swing cylinder arrangement for use with the mower-conditioner

BACKGROUND OF THE INVENTION

Side-pull rotary mower-conditioners typically use a tongue swing cylinder mounted to the right of the tongue pivot. Thus, in order to swing the tongue outwardly to a normal working position where the towing tractor travels a path to the left of the standing crop being cut by the mower-conditioner, the cylinder must be extended from a fully retracted position, which it occupies when the tongue is in a central position for permitting the transport of the mower-conditioner.

This cylinder placement makes it difficult to have a low-cost lock for transport, as is necessary for holding the cylinder in its retracted position. It is also difficult to provide multiple fixed operating positions, which are achieved by placing the cylinder in extended positions. With the prior art cylinder position, an external mechanical device is provided that stops movement of the tongue by locking it to the carrier frame. Multiple operating positions are achieved by selectively repositioning the cylinder by removing the cylinder mounting pins and placing them in alternate sets of mounting holes.

While it is known to provide a mower-conditioner with a tongue having its rear end pivotally mounted to a forward projection of the main frame located at the left side of the header, and to provide an extensible and retractable hydraulic cylinder at the left side of the tongue pivot, this location of the tongue has the disadvantage that it adds to the overall transport width of the mower-conditioner.

SUMMARY OF THE INVENTION

According to the present invention, there is provided a side-pull mower-conditioner equipped with an improved tongue and tongue swing cylinder arrangement.

An object of the invention is to provide a tongue and tongue swing cylinder arrangement for a side-pull mower-conditioner that does not add to the transport width of the mower-conditioner.

Yet another object of the invention is to provide a tongue and tongue swing cylinder arrangement, as defined in the preceding object, wherein the tongue extends over the header of the mower-conditioner, with the swing cylinder being located to the left of the upright pivot axis of the coupling of the rear end of the tongue to the main frame of the mower-conditioner.

Still another object is to provide a simple lock device for maintaining the cylinder in a fully extended condition for maintaining the tongue in a transport position when it is desired to tow the mower-conditioner along a road, and to provide a simple stop structure for preventing the cylinder from becoming fully retracted so as to position the tongue for operation in other than an extreme or leftmost operating position.

These and other objects of the invention will become more apparent from a reading of the ensuing description together with the appended drawings.

DESCRIPTION OF THE PREFERRED EMBODIMENT

Figure 1:
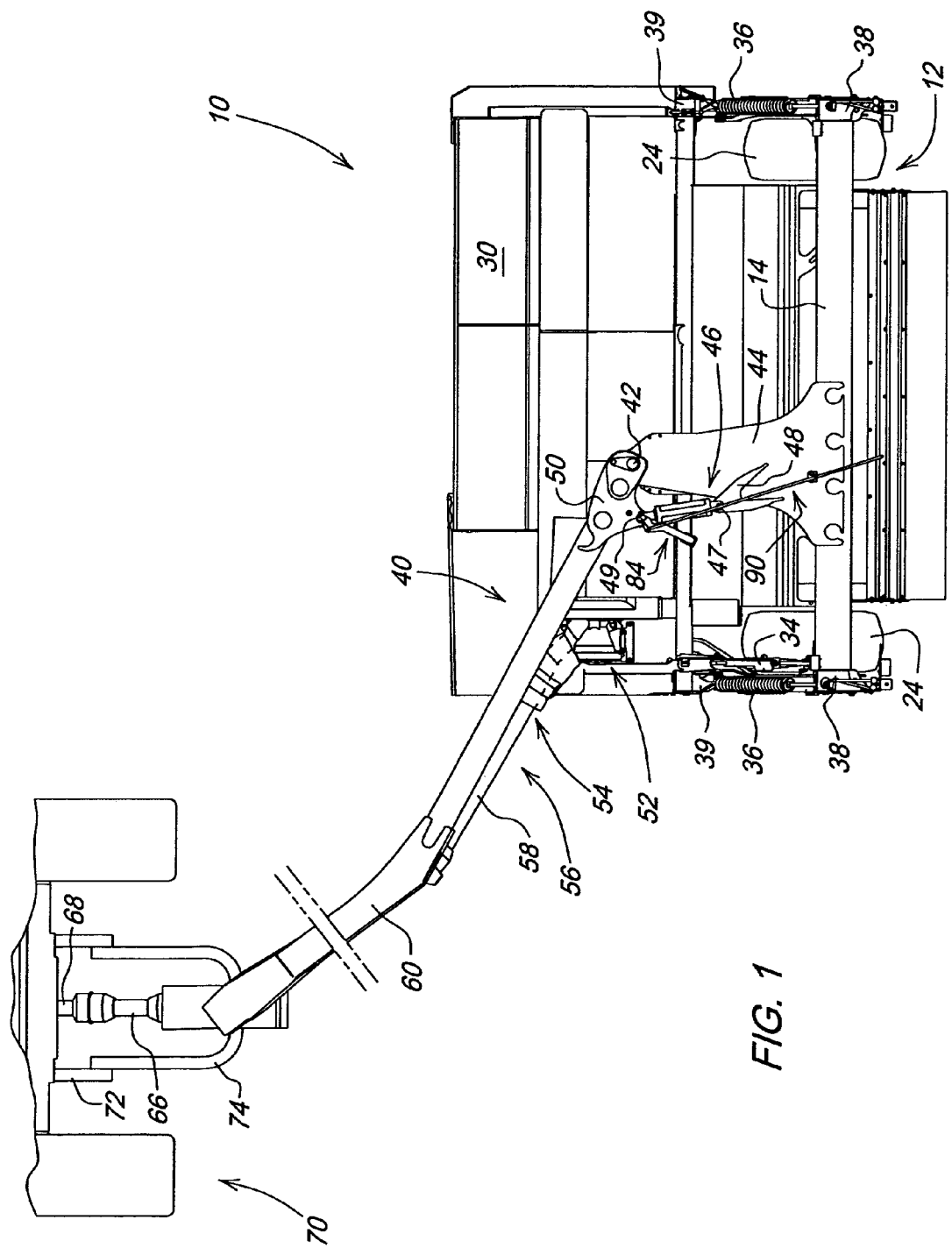
FIG. 1 is a somewhat schematic, top plan view of a rotary side-pull mower-conditioner showing the draft tongue in solid lines in an extreme leftward working position with the tongue swing actuator being shown fully retracted.
Figure 2:
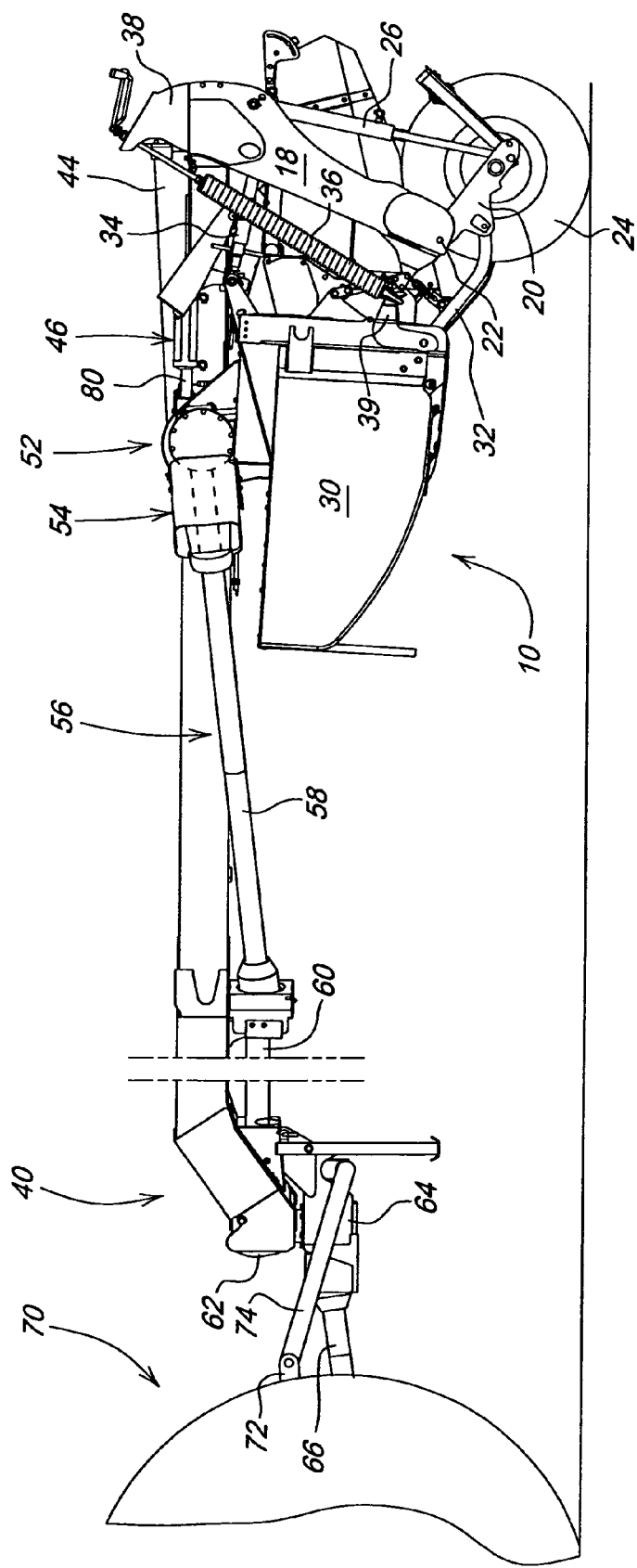
FIG. 2 is a left side view of the mower-conditioner shown in FIG. 1.

Referring now to FIGS. 1 and 2, there is shown a rotary side-pull mower-conditioner 10 including a main frame 12 comprising an inverted U-shaped frame member defined by a beam 14 extending transversely between, and joined to right- and left-hand downwardly projecting legs 18. A pair of trailing wheel-support arms 20 have respective forward ends respectively pivotally coupled to the downwardly projecting by transverse pivot pins 22. Mounted to rear regions of each of the support arms 20 is a transverse axle carrying a ground wheel 24. Coupled between each of the legs 18 and the adjacent trailing arm 20 is an extensible and retractable hydraulic actuator 26.

A crop harvesting header or platform 30 is suspended from the main frame 12 by a linkage including a pair of lower links 32 and an upper link 34, with the lower links 32 being located at opposite ends of the header and coupled between a lower rear region of the header and the adjacent wheel support arm 20, and with the upper link 34 being in the form of a turnbuckle coupled between an upper rear region of the left-hand end of the header 30 and a bracket depending from the beam 14 at a location beside the left-hand leg 18. A pair of counterbalance coil springs 36 respectively have upper ends coupled to brackets 38 fixed to upper ends of the legs 18, and lower ends coupled to brackets 39 fixed to lower regions of opposite ends of the header frame 30.

It is noted that when the hydraulic actuators 26 are contracted, the header wheel support arms 20 are in raised positions relative to the main frame 12 and the header 30 is in a lowered working position. When the actuators 26 are extended, the wheel support arms 20 are in lowered positions relative to the main frame 12 and the header 30 is in a raised transport position, as shown in FIG. 2.

An angled draft tongue 40 has a rear end defined by vertically spaced plates 41. The plates 41 straddle a forward end of, and are pivotally coupled by a pin assembly 42 to a tongue carrier 44 projecting forwardly from the beam 14. With a given tongue 40, the lateral location of the carrier 44 on the beam 14 will depend on the width of the header 30. An extensible and retractable tongue swing cylinder 46 has its cylinder end pivotally coupled, as by a vertical pin 47, to a bracket 48 fixed to a central left region of the carrier 44 and has its rod end pivotally coupled, as by a vertical pin 49, to an ear 50 joined to a rear left region of the tongue 40.

The mower-conditioner 10 includes a power distribution gearbox 52 mounted to a top left location of the header 30. The gearbox 52 is slightly forward of the pivotal connection 42 between the tongue 40 and the tongue carrier 44. The gearbox 52 includes an input shaft angled to the left from an imaginary line extending longitudinally in a direction of travel. A driveline 56 includes a rear telescopic drive shaft 58 having a rear end coupled to a slip clutch assembly 54, which is in turn coupled to the input shaft of the gearbox 52. A front end of the telescopic shaft 58 is coupled to the rear end of a pedestal shaft 60 (FIG. 2) that is mounted to the tongue 40 so as to be fixed in position. A forward end of the pedestal shaft 60 is coupled to the output shaft of an upper right-angle gearbox 62 that is fixed to the tongue 40. A lower right-angle gear box 64 is mounted for swiveling about a vertical axis passing through an input shaft of the upper gear box 62 to which an output shaft of the lower gearbox 64 is coupled. An input shaft of the lower gearbox 64 is coupled to the rear end of a front telescopic shaft 66 having its front end coupled to the power take-off shaft 68 of a towing tractor 70.

The towing tractor 70 includes a pair of lower draft arms 72 respectively coupled to forward ends of opposite legs of a U-shaped coupling structure 74 that is mounted for pivoting with the lower gear box 64 and for swiveling about a horizontal axis (not shown). The couplings between the various drive shafts, and between the drive shafts and the respective gearboxes 62 and 64 are each effected by a single cardan joint.

As shown in FIG. 1, the tongue swing cylinder 46 is fully retracted with the tongue being shown in an extreme leftward position, which would be a suitable operating position for the header 30 when operating on a hill side with the header operating up hill from the towing tractor 70. Working positions other than this extreme position are possible.

Figure 3:
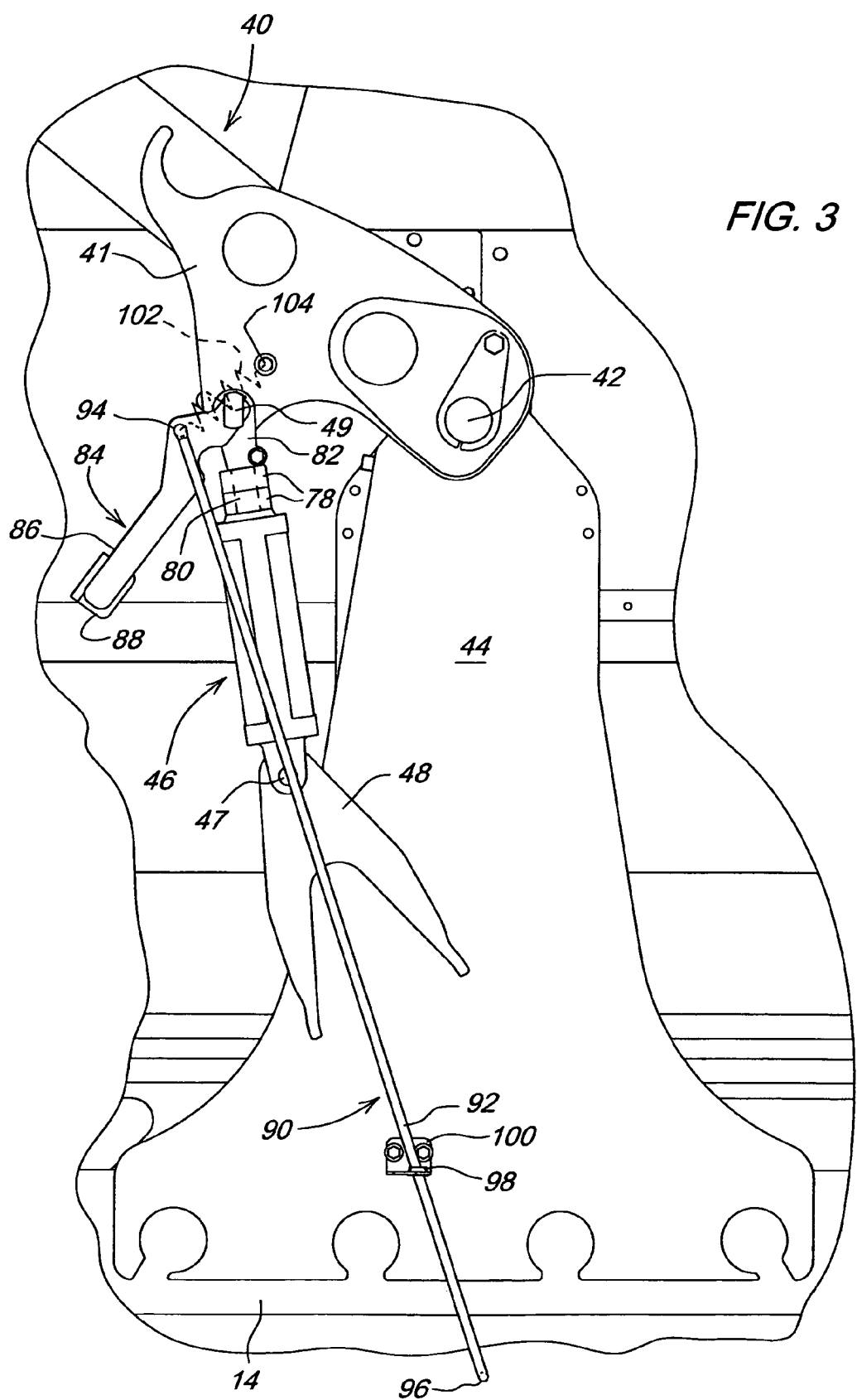
FIG. 3 is a somewhat schematic top plan view showing the connection of the tongue with the main frame of the mower-conditioner, with the tongue swing cylinder being shown retracted to a desired location determined by a stop arrangement, and with the swing cylinder also being equipped with a locking bar for preventing retraction of the tongue swing cylinder when the tongue is in a transport position.
Figure 4:
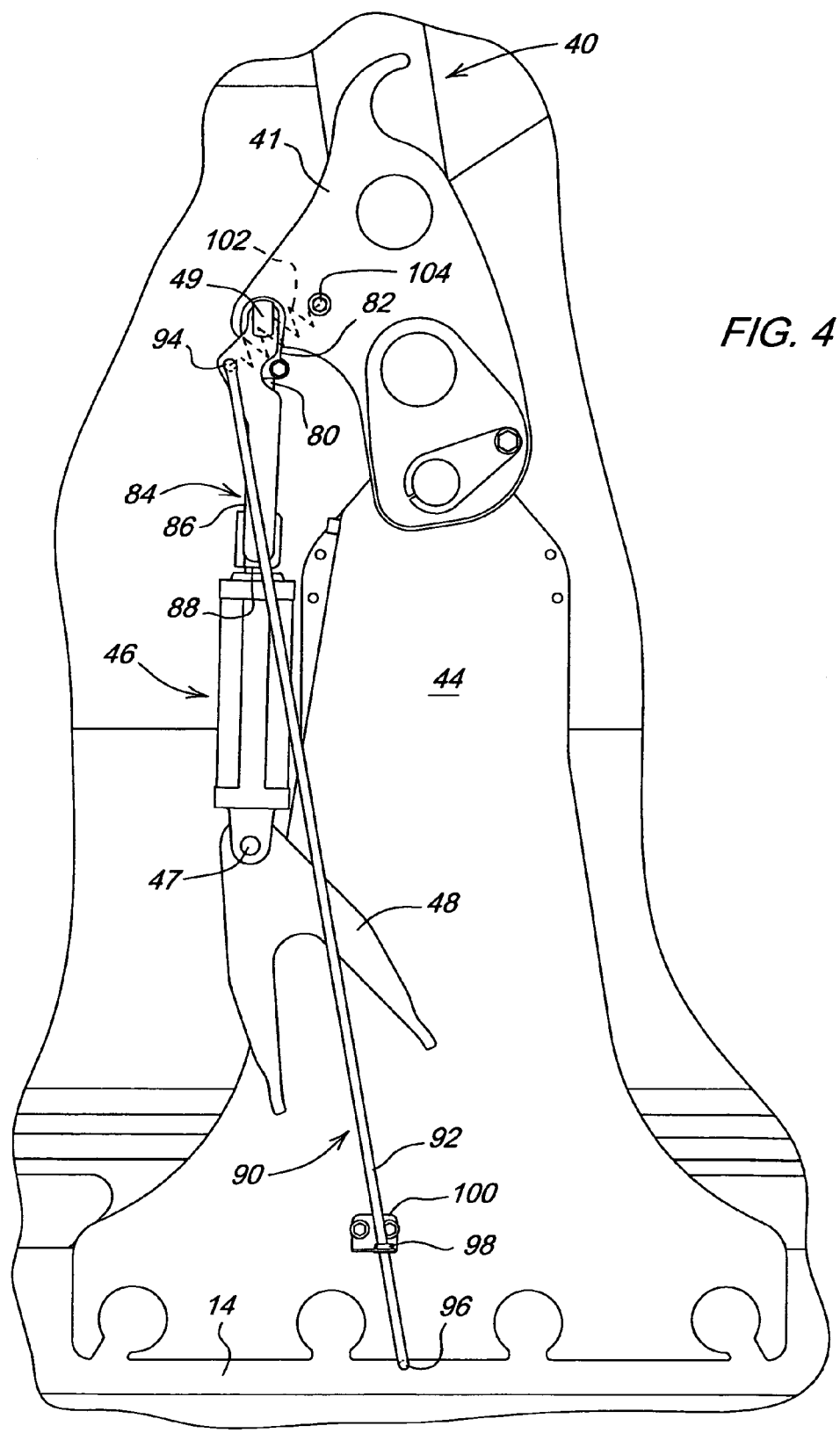
FIG. 4 is a view like FIG. 3, but showing the tongue swing cylinder in a fully extended position, wherein it establishes the transport position of the tongue, with the tongue swing cylinder being shown locked in place by the locking bar.

Referring now to FIGS. 3 and 4, it can be seen that the tongue swing cylinder 46 is provided with a stop arrangement including a pair of a stop rings 78 located on a piston rod 80 (visible only in FIG. 4) of the cylinder 46 at a location abutting a clevis 82 fixed to a forward end of the piston rod 80. It will be appreciated that, when the cylinder 46 is retracted, as shown in FIG. 3, the stop rings 78 will prevent full retraction of the cylinder 46 which will result in the tongue 40 being stopped at a desired working position, for example a position wherein the towing tractor 70 tracks just to the left of a standing crop to be harvested. This is an appropriate operating position for relatively flat or level terrain conditions.

In addition to the stop rings 78, the stop arrangement includes a locking bar 84 which includes a pair of vertically spaced straps 86 having first ends joined together by a U-shaped member 88, which opens to the right, as viewed in FIGS. 3 and 4. Second ends of the straps 86 are disposed in straddling relationship to the cylinder clevis 82 and mounted for pivoting about cylinder mounting pin 49. The locking bar 84 is mounted for pivoting about the connecting pin 49 between an unlocked position, as shown in FIG. 3, which permits unimpeded operation of the tongue swing cylinder 46, and a locked position, as shown in FIG. 4, wherein the locking bar 84 extends coextensive with the fully extended piston rod 80 of the hydraulic cylinder 86 and abuts a forward end of the cylinder barrel so as to prevent retraction of the rod 80 and thereby retain the tongue 40 in its transport position. It is to be noted that the spacing between the straps 86 of the locking bar 84 is such that the latter will easily pass over the stop rings 78.

Provided for moving the locking bar 84 between its locked and unlocked positions is a latch-operating rod 90. The rod 90 includes an elongate horizontal main section 92 joined to a down-turned front end 94, which projects through vertically aligned holes respectively provided in leftwardly offset regions of the locking bar straps 86, and a down-turned rear end defining a handle 96. The main section 92 of the latch-operating rod 90 is received in a guide grommet 98 provided in a vertically leg of an L-shaped support bracket 100 having a horizontal leg bolted to a rear region of the tongue support 44. The location of the handle 96 makes it possible for an operator to stand at the back of the mower-conditioner 10 and easily grasp the handle 96 so as to effect movement of the latch bar 84 between its unlocked and locked positions. A tension coil spring 102 is coupled between the bottom of the front end 94 of the rod 90 and the bottom of a spring mounting pin 104 extending through vertically aligned holes provided in the spaced plates 41. The spring 102 is so located relative to the cylinder mounting pin 49 that its line of force is located forwardly of the pin 49 when the locking bar 84 is in its unlocked position, as shown in FIG. 3, whereby the spring 102 acts to resiliently resist movement of the locking bar 84 from its unlocked position. When the operator pulls on the rod 90 so as to move the locking bar 84 from its unlocked position to its locked position shown in FIG. 4, the spring moves over the center of the pin 49 so that its line of force is disposed to the rear of the pin 49, thus resulting in the spring 104 acting to resist movement of the locking bar 84 from its locked position.

The operation of the stop rings 78 and locking bar 84 is thought to be clear from the foregoing description. Suffice it to say that for hill side work, no stop rings 78 are used which permits the tongue 40 to be swung to an extreme leftward operating position by fully retracting the tongue swing cylinder 46. In order to stop the tongue at other desired operating positions, one or more stop rings 78 are mounted on the piston rod 80 so as to limit the amount of retraction of the rod 80 so as to position the tongue 40 as desired.

The tongue 40 may be placed in its rightmost position for transport by fully extending the piston rod 80. The tongue 40 is locked in the transport position by swinging the locking bar 84 counterclockwise about the pivot pin 49, as viewed in FIG. 3, by pulling rearwardly on the latch-operating rod 90 until the locking bar 84 is disposed coextensive with the piston rod 80 and bears against the front end of the barrel of the cylinder 46, thus locking the cylinder 46 in its extended condition and, in this way, locking the tongue 40 in its transport position.

Instead of the locking bar 84 being designed for abutting the barrel of the cylinder 46 for locking the tongue 40 in its transport position, the locking bar 84 could be designed for moving into engagement with an appropriate locking surface provided on the tongue support 44.

Having described the preferred embodiment, it will become apparent that various modifications can be made without departing from the scope of the invention as defined in the accompanying claims.

The invention claimed is:

1. In a side-pull mower-conditioner including a wheel-supported main frame, a header suspended from the main frame, a draft tongue extending over said header and having a rear end pivotally mounted to an upper location of said main frame and establishing an upright axis about which the tongue may swing when moving between a transport position, wherein the front end of the tongue is located in front of the mower-conditioner so that the mower-conditioner will trail entirely within a path traversed by a towing tractor, an extreme working position, wherein the front end of the tongue is positioned to the left of the header a distance sufficient for the towing tractor to operate beside uncut crop, and a hydraulic actuator coupled between said main frame and said tongue and having a cylinder carrying an extensible and retractable piston rod for moving said tongue between said transport and working positions, the improvement comprising: said hydraulic actuator being positioned leftward of said upright axis and said piston rod being fully extended when said tongue is in said transport position and fully retracted when said tongue is in said extreme working position; and a stop arrangement including a stop structure provided for selective engagement with said piston rod for limiting retraction of said piston rod for disposing said tongue in a pre-selected working position rightward of said extreme working position.

2. The side-pull mower-conditioner, as defined in claim 1, wherein said stop structure is defined by at least one ring member received on said piston rod.

3. The side-pull mower-conditioner, as defined in claim 1, wherein said stop structure further includes a locking member mounted for being selectively moved to a locking position wherein it is disposed between said tongue and said main frame for preventing retraction of said piston rod from said fully extended position when said tongue is in said transport position.

4. The side-pull mower-conditioner, as defined in claim 3, wherein said locking member is mounted for being selectively moved to a locking position wherein it is disposed between said tongue and said cylinder and in that way is coupled between said tongue and main frame for preventing retraction of said piston rod from said fully extended position when said tongue is in said transport position.

5. The side-pull mower-conditioner, as defined in claim 4, wherein said locking member includes a pair of vertically spaced straps for permitting said locking member to be placed into said locking position without interfering with said stop structure.

6. The side-pull mower-conditioner, as defined in claim 5, wherein said stop structure is defined by at least one ring member received on said piston rod.

7. The side-pull mower-conditioner, as defined in claim 2, wherein said locking member is mounted for pivoting about a pin coupling said piston rod to said tongue; and a spring being coupled between said tongue and locking member and acting for selectively biasing said locking member to its unlocking position, and to its locking position.

8. In a side-pull mower-conditioner including a wheel-supported main frame, a header suspended from the main frame, a draft tongue extending over said header and having a rear end pivotally mounted to an upper location of said main frame and establishing an upright axis about which the tongue may swing when moving between a transport position, wherein the front end of the tongue is located in front of the mower-conditioner so that the mower-conditioner will trail entirely within a path traversed by a towing tractor, an extreme working position, wherein the front end of the tongue is positioned to the left of the header a distance sufficient for the towing tractor to operate beside uncut crop, and a hydraulic actuator coupled between said main frame and said tongue and having a cylinder carrying an extensible and retractable piston rod for moving said tongue between said transport and working positions, the improvement comprising: said hydraulic actuator being positioned leftward of said upright axis and said piston rod being fully extended when said tongue is in said transport position and fully retracted when said tongue is in said extreme working position; and a stop arrangement including a locking member mounted for being selectively moved to a locking position wherein it is disposed between said tongue and said main frame for preventing retraction of said piston rod from said fully extended position when said tongue is in said transport position.

* * * * *